S. Down,
Gas Meter.
No. 24,108. Patented May 24, 1859.
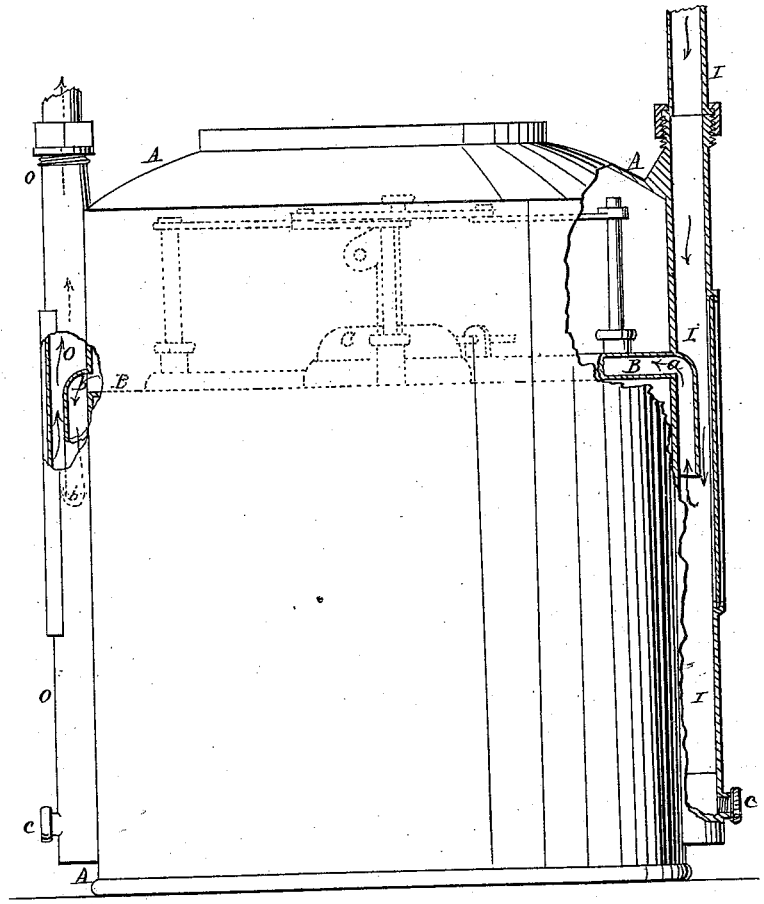
Witnesses
Inventor:
Saml Down

UNITED STATES PATENT OFFICE.

SAMUEL DOWN, OF NEW YORK, N. Y.

IMPROVEMENT IN DRY GAS-METERS.

Specification forming part of Letters Patent No. 24,108, dated May 24, 1859.

*To all whom it may concern:*

Be it known that I, SAMUEL DOWN, of the city, county, and State of New York, have invented a new and useful Improvement in Dry Gas-Meters; and I do hereby declare that the following is a full, clear, and exact description of the same, reference being had to the accompanying drawing, forming part of this specification, said drawing representing an elevation of a dry gas-meter, partly in section, with my improvement applied.

In dry gas-meters it is customary to extend the inlet and outlet pipes downward below the communications with the measuring-chambers and valve-chamber of the meter to form wells for the collection of water and other liquid matters or impurities which, having passed to the meter in a state of vapor, are caused to be deposited in the said pipes by condensation; but no efficient means have heretofore been employed to prevent such matters from accumulating in the said wells to such a height as to enter the channels of communication between the inlet and outlet pipes and the measuring-chambers and valve-chamber and clogging the valves or otherwise interfering with the working of the meter, except the introduction of gage-glasses in the sides of the said wells that it might be seen when the liquid had accumulated to such a height as to require to be drawn off by the removal of the screw-plugs provided for the purpose at the bottoms of the wells, and in case of any neglect to examine the gage-glasses the liquid has been liable to rise so high as to enter the chambers.

The object of my invention is to prevent the possibility of the liquids rising to such a height in the wells; and to this end my invention consists in making the mouths of the channels of communication between the inlet and outlet pipes and the measuring-chambers and valve-chamber dip downward into the wells in such a manner that before the liquid matters can rise high enough to reach the valve or valves or enter the said chambers they will close and seal the said mouths against the passage of the gas, and so shut off the supply until the said matters are drawn off.

To enable others skilled in the art to apply my invention, I will proceed to describe its construction and operation.

A is the outer shell or casing of the meter, which may be of any known construction.

I is the inlet-pipe, and O the outlet-pipe.

B is the plate which separates the valve-chamber or outlet-chamber in the upper part of the shell or case from the measuring-chambers in the lower part, and above which the valve C works.

$a$ is the channel of communication leading from the inlet-pipe to the outlet-pipe, and $b$ the channel of communication from the valve-chamber to the outlet-pipe.

I' is the well formed by the continuation of the inlet-pipe below the channel $a$, and O' the well formed by the continuation of the outlet-pipe below the channel $b$. $c\ c$ are the screw-plugs at the bottoms of the wells for drawing off the liquids therefrom.

By examining the drawing, it will be seen that the mouths $a'\ b'$ of the channels $a$ and $b$ both dip down some distance into the wells I' and O' instead of being merely orifices above the plate B; and it will be readily understood that when the liquid matters rise as high as these mouths the said mouths must be closed and the gas shut off, while the liquid is still so low in the wells that it cannot possibly reach the valves or the chambers of the meter.

What I claim as my invention, and desire to secure by Letters Patent, is—

Constructing or arranging the mouths $a'\ b'$ of the channels of communication $a\ b$ between the inlet and outlet pipes and the measuring-chambers and valve-chamber of a dry gas-meter, to dip down in the wells below the said pipes, substantially as and for the purpose herein set forth.

SAML. DOWN.

Witnesses:
 J. N. WELLER, Jr.,
 THOS. J. EARLE.